(12) United States Patent
Nishimura et al.

(10) Patent No.: US 11,971,186 B2
(45) Date of Patent: Apr. 30, 2024

(54) INFORMATION PROCESSING METHOD, INFORMATION PROCESSING APPARATUS, AND PROGRAM

(71) Applicant: DAIKIN INDUSTRIES, LTD., Osaka (JP)

(72) Inventors: Tadafumi Nishimura, Osaka (JP); Kouji Nagasawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/754,274

(22) PCT Filed: Jun. 17, 2020

(86) PCT No.: PCT/JP2020/023687
§ 371 (c)(1),
(2) Date: Mar. 29, 2022

(87) PCT Pub. No.: WO2021/065093
PCT Pub. Date: Apr. 8, 2021

(65) Prior Publication Data
US 2022/0364754 A1     Nov. 17, 2022

(30) Foreign Application Priority Data

Sep. 30, 2019    (JP) ................................. 2019-180996

(51) Int. Cl.
*F24F 11/62*     (2018.01)
*F24F 11/46*     (2018.01)
(Continued)

(52) U.S. Cl.
CPC .............. *F24F 11/62* (2018.01); *F24F 11/46* (2018.01); *F24F 11/52* (2018.01); *F24F 11/63* (2018.01);
(Continued)

(58) Field of Classification Search
CPC .. F24F 11/46; F24F 11/52; F24F 11/62; F24F 11/63; F24F 2110/12; F24F 2140/60
See application file for complete search history.

(56) References Cited

U.S. PATENT DOCUMENTS

2002/0007388 A1    1/2002   Bannai et al.
2004/0254686 A1    12/2004   Matsui et al.
(Continued)

FOREIGN PATENT DOCUMENTS

JP      2002-032438     1/2002
JP      2005-009852     1/2005
(Continued)

OTHER PUBLICATIONS

1 International Search Report for PCT/JP2020/023687 dated Aug. 11, 2020.
(Continued)

*Primary Examiner* — Crystal J Barnes-Bullock
(74) *Attorney, Agent, or Firm* — IPUSA, PLLC

(57) ABSTRACT

An information processing apparatus performs a first estimation process based on a data set including a combination of information indicating a situation and information on power consumption when a first air conditioner, installed in a predetermined location, has been operated. The first estimation process is a process of estimating information on power consumption when the first air conditioner, installed in the predetermined location, is operated in a predetermined situation.

10 Claims, 7 Drawing Sheets

(51) Int. Cl.
  *F24F 11/52* (2018.01)
  *F24F 11/63* (2018.01)
  *F24F 110/12* (2018.01)
  *F24F 140/60* (2018.01)

(52) U.S. Cl.
  CPC ....... *F24F 2110/12* (2018.01); *F24F 2140/60* (2018.01)

(56) References Cited

U.S. PATENT DOCUMENTS

| | | | |
|---|---|---|---|
| 2011/0035075 | A1 | 2/2011 | Tomita et al. |
| 2014/0316584 | A1 | 10/2014 | Matsuoka et al. |
| 2016/0370814 | A1 | 12/2016 | Hanley et al. |
| 2017/0167741 | A1 | 6/2017 | Otsuki et al. |

FOREIGN PATENT DOCUMENTS

| | | | | | |
|---|---|---|---|---|---|
| JP | | 3783929 | B2 * | 6/2006 | |
| JP | | 2011-036084 | | 2/2011 | |
| JP | | 2011-250027 | | 12/2011 | |
| JP | | 2013-213669 | | 10/2013 | |
| JP | | 2017-112771 | | 6/2017 | |
| JP | | 2017112771 | A * | 6/2017 | |
| JP | | 2017139031 | A * | 8/2017 | |
| JP | | 2018-091560 | | 6/2018 | |
| JP | | 2019-032157 | | 2/2019 | |
| JP | | 2021047012 | A * | 3/2021 | .............. F24F 11/50 |
| JP | | 7364923 | B2 * | 10/2023 | .............. F24F 11/50 |
| WO | | 2017/098552 | | 6/2017 | |
| WO | WO-2020059473 | A1 * | | 3/2020 | |
| WO | WO-2021065093 | A1 * | | 4/2021 | .............. F24F 11/46 |

OTHER PUBLICATIONS

International Preliminary Report on Patentability for PCT/JP2020/023687 dated Apr. 14, 2022.
Extended European Search Report for 20871377.6 dated Sep. 12, 2022.
Afram Abdul et al: "Review of modeling methods for HVAC systems", Applied Thermal Engineering, Pergamon, Oxford, GB, vol. 67, No. 1, Apr. 2, 2014, pp. 507-519.
Office Action for EP20871377.6 dated May 9, 2023.

* cited by examiner

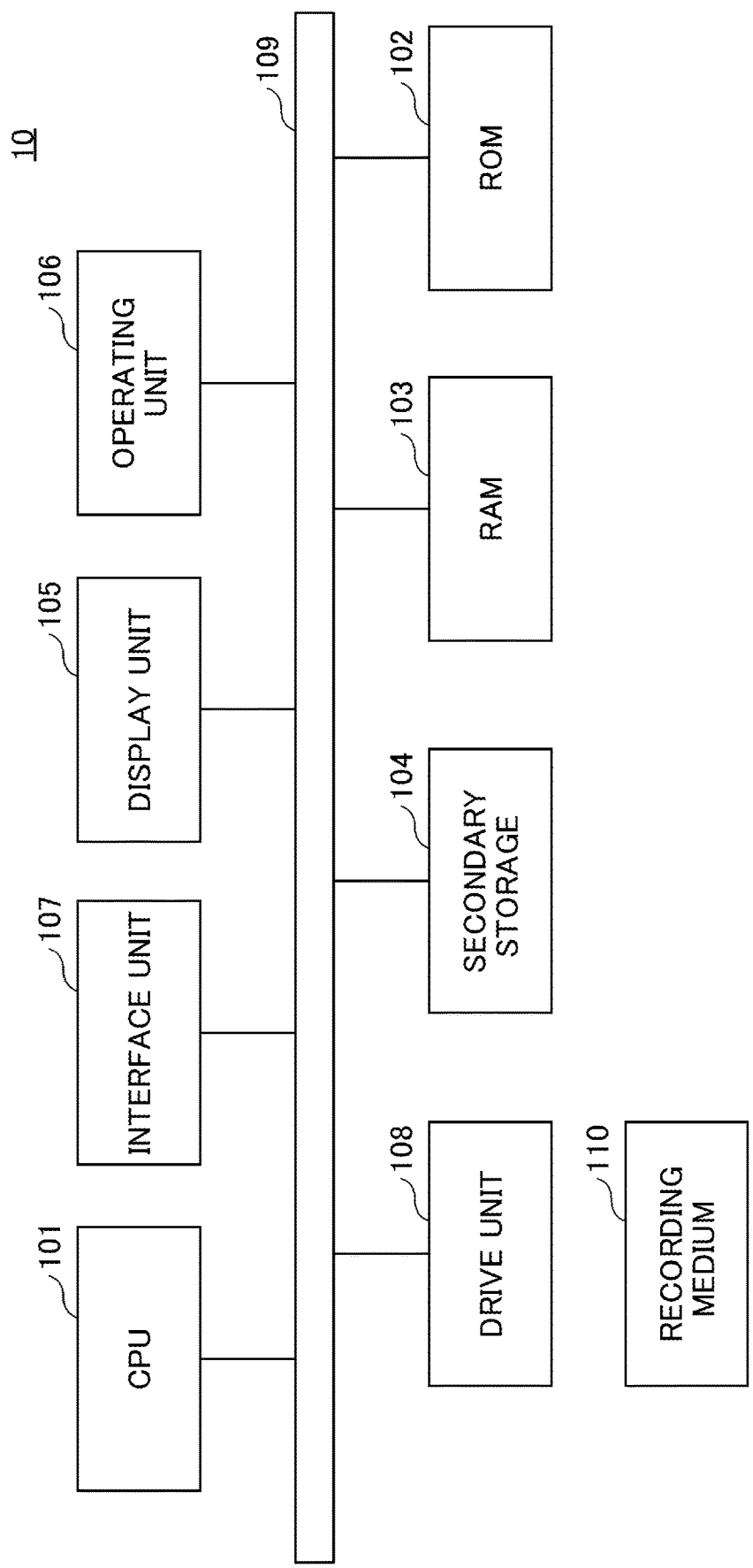

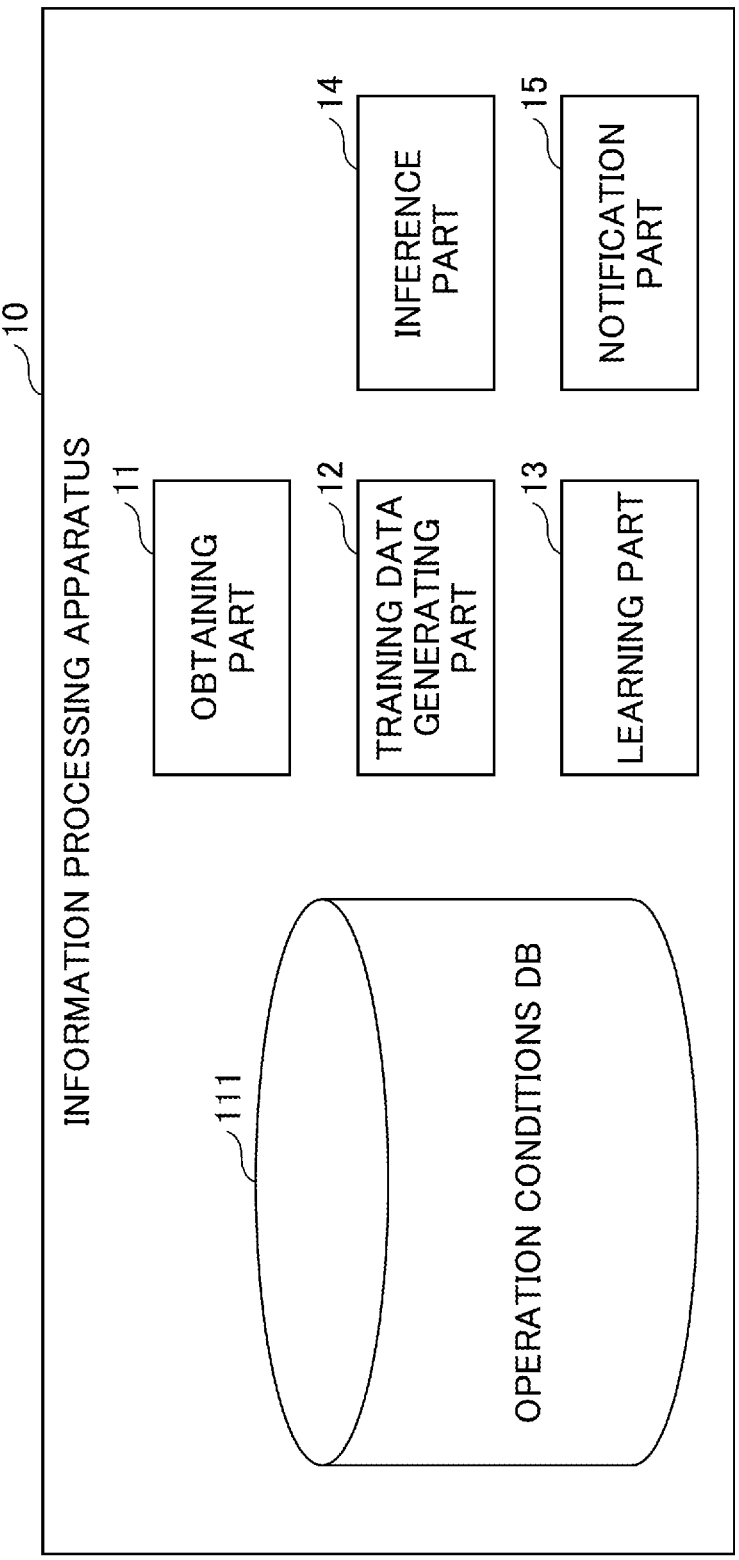

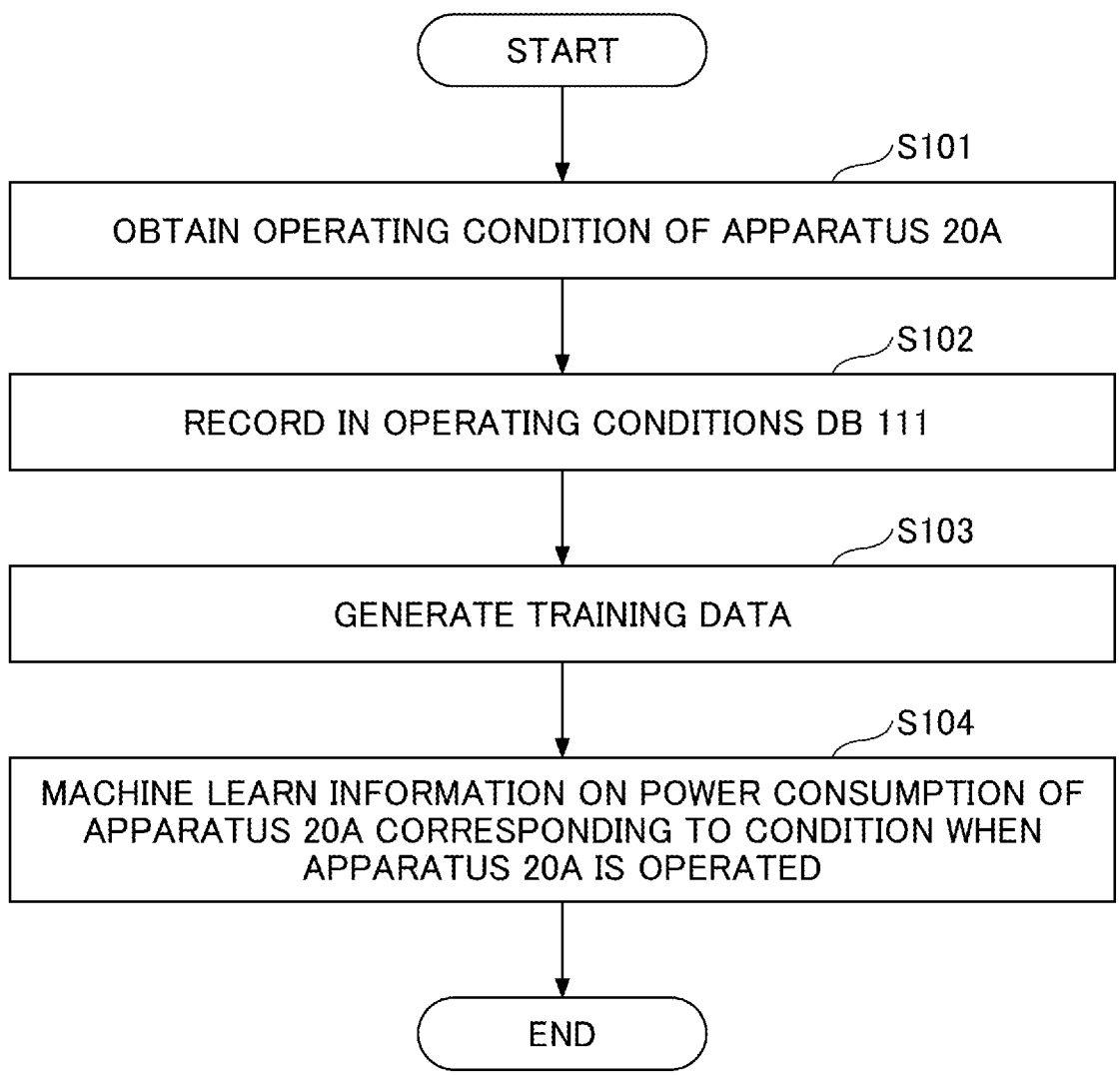

FIG.5

| APPA-RATUS ID | DATE AND TIME | INFORMATION INDICATING SURROUNDING ENVIRONMENT WHEN APPARATUS HAS BEEN OPERATED ||||||||| INFORMATION ON OPERATION SETTING | INFORMATION ON POWER CONSUMPTION |
|---|---|---|---|---|---|---|---|---|---|---|---|
| | | OUTDOOR TEMP. | NUMBER OF PEOPLE INSIDE ROOM | INDOOR ILLUMINANCE | OUTDOOR HUMIDITY | SOLAR IRRADIANCE | WEATHER TYPE | INDOOR TEMP. | INDOOR HUMIDITY | | |
| APPARATUS A | DATE AND TIME A | OUTDOOR TEMP. A | NUMBER OF PEOPLE A | ILLUMINANCE A | OUTDOOR HUMIDITY A | SOLAR IRRADIANCE A | WEATHER TYPE A | INDOOR TEMP. A | INDOOR HUMIDITY A | INFORMATION ON OPERATION SETTING A | INFORMATION ON POWER CONSUMPTION A |
| | DATE AND TIME B | OUTDOOR TEMP. B | NUMBER OF PEOPLE B | ILLUMINANCE B | OUTDOOR HUMIDITY B | SOLAR IRRADIANCE B | WEATHER TYPE B | INDOOR TEMP. B | INDOOR HUMIDITY B | INFORMATION ON OPERATION SETTING B | INFORMATION ON POWER CONSUMPTION B |
| | ... | ... | ... | ... | ... | ... | ... | ... | ... | ... | ... |
| APPARATUS B | ... | ... | ... | ... | ... | ... | ... | ... | ... | ... | ... |
| ... | | | | | | | | | | | |

111

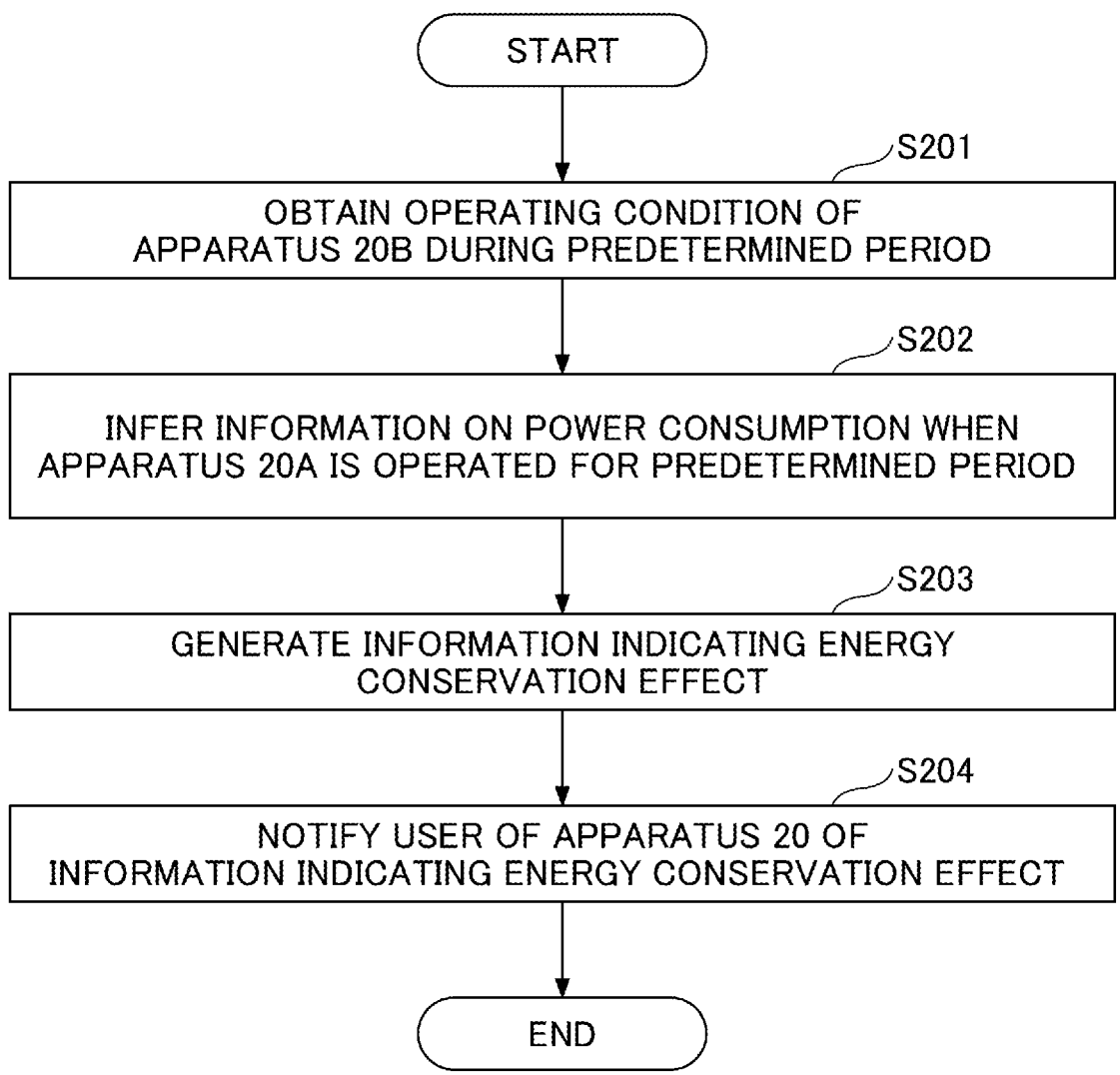

INFORMATION PROCESSING METHOD, INFORMATION PROCESSING APPARATUS, AND PROGRAM

TECHNICAL FIELD

The present disclosure relates to an information processing method, an information processing apparatus, and a program.

BACKGROUND ART

Conventionally, a technique of updating equipment with new equipment having higher energy conservation performance than old equipment and estimating the energy conservation effect due to updating the equipment is known (for example, see Patent Document 1).

RELATED-ART DOCUMENTS

Patent Document

[Patent Document 1] Japanese Laid-Open Patent Publication No. 2002-032438

SUMMARY OF THE INVENTION

Problem to be Solved by the Invention

However, in the conventional technique, if the situation when the old equipment was in operation is different from the situation when the new equipment was in operation, it may not be possible to appropriately estimate the energy conservation effect due to updating the equipment. The purpose is to provide a technique that can appropriately estimate the energy conservation effect due to updating the equipment.

Means to Solve the Problem

An information processing method implemented by an information processing apparatus, according to a first aspect of the present disclosure, includes performing a first estimation process, based on a data set including a combination of information indicating a situation and information on power consumption when a first air conditioner, installed in a predetermined location, has been operated. The first estimation process is a process of estimating information on power consumption when the first air conditioner, installed in the predetermined location, is operated in a predetermined situation.

According to a second aspect of the present disclosure, the information processing method as described in the first aspect further includes performing a process of notifying of information based on a comparison of information on power consumption when a second air conditioner, being operated instead of the first air conditioner, has been operated in a first situation, with information on power consumption, estimated by the first estimation process, when the first air conditioner is operated in the first situation.

According to a third aspect of the present disclosure, the information processing method as described in the first or second aspect further includes performing a second estimation process that estimates information on power consumption when a second air conditioner is operated in the predetermined situation, the second estimation process being based on a data set including a combination of information indicating a situation and power consumption when the second air conditioner, being operated instead of the first air conditioner, has been operated, and a process of notifying of information based on a comparison of the information on power consumption, estimated by the first estimation process, when the first air conditioner is operated, with the information on power consumption, estimated by the second estimation process, when the second air conditioner is operated.

According to a fourth aspect of the present disclosure, the information processing method as described in any one of the first to third aspects further includes estimating an air conditioning load according to a situation in the predetermined location, based on the data set including the combination of the information indicating a situation and the information on power consumption when the first air conditioner, installed in the predetermined location, has been operated, and performing a process of notifying of information on power consumption of a second air conditioner, being operated instead of the first air conditioner, with respect to the estimated air conditioning load.

According to a fifth aspect of the present disclosure, in the information processing method as described in any one of the second to fourth aspects, the second air conditioner is an apparatus installed in the predetermined location instead of the first air conditioner, or is the first air conditioner whose control parameter has been changed.

According to a sixth aspect of the present disclosure, in the information processing method as described in any one of the first to fifth aspects, the information indicating the situation includes at least one of indoor temperature, indoor humidity, outdoor temperature, and outdoor humidity.

According to a seventh aspect of the present disclosure, in the information processing method as described in any one of the first to sixth aspects, the information on power consumption includes at least one of a power consumption amount integrated value, a power consumption peak value, a current value, a high-pressure pressure, a low-pressure pressure, a compressor rotational speed, and information indicating compressor operating efficiency.

According to an eighth aspect of the present disclosure, an information processing apparatus includes a first estimation part configured to estimate information on power consumption, based on a data set including a combination of information indicating a situation and information on power consumption when a first air conditioner, installed in a predetermined location, has been operated. The first estimation part estimates the information on power consumption when the first air conditioner, installed in the predetermined location, is operated in a predetermined situation.

According to a ninth aspect of the present disclosure, a program causes a computer to execute a first estimation process, based on a data set including a combination of information indicating a situation and information on power consumption when a first air conditioner, installed in a predetermined location, has been operated. The first estimation process is a process of estimating information on power consumption when the first air conditioner, installed in the predetermined location, is operated in a predetermined situation.

BRIEF DESCRIPTION OF DRAWINGS

FIG. 2 is a diagram illustrating an example of a hardware configuration of an information processing apparatus according to the embodiment;

FIG. 3 is a diagram illustrating an example of a functional block diagram of the information processing apparatus according to the embodiment;

FIG. 4 is a flowchart illustrating an example of the process of the information processing apparatus during learning according to the embodiment;

FIG. 5 is a diagram illustrating an example of a history of operating conditions stored in operating conditions DB according to the embodiment;

FIG. 6 is a flowchart illustrating an example of the process of the information processing apparatus during inference of an energy conservation effect according to the embodiment.

MODE FOR CARRYING OUT THE INVENTION

Figure 1:
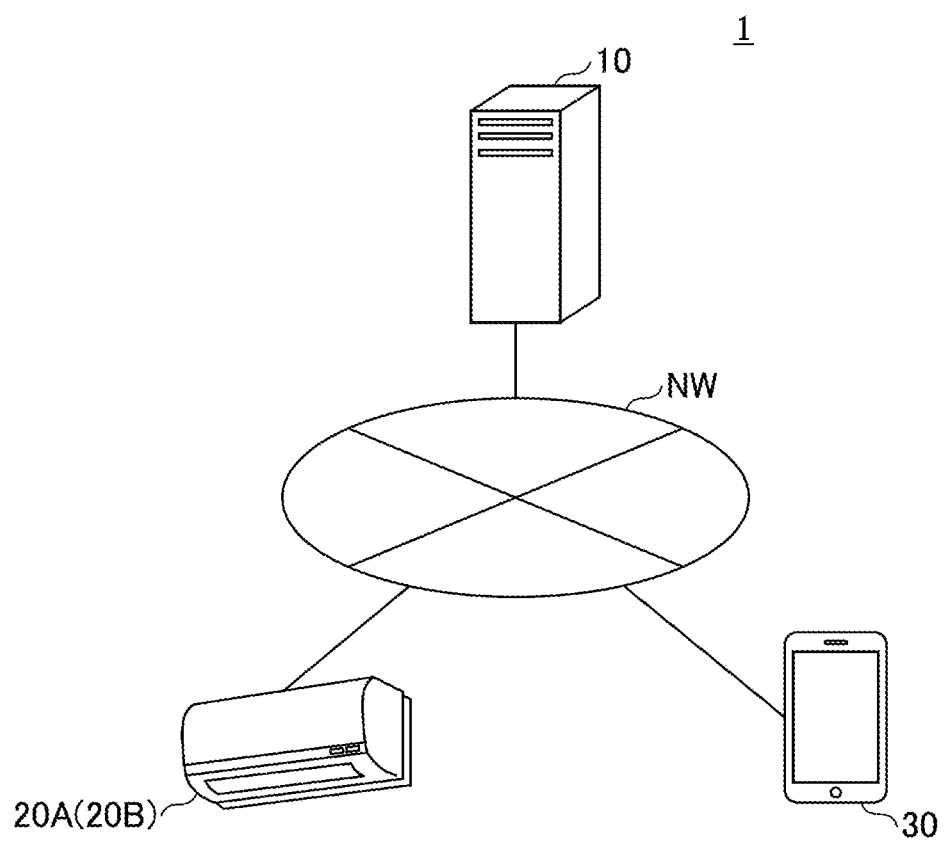
FIG. 1 is a diagram illustrating an example of a system configuration of an information processing system according to an embodiment.

Hereinafter, each embodiment will be described with reference to the drawings. In the present specification and the drawings, the components having substantially the same functional configuration are designated by the same reference numerals to omit duplicate explanations.

System Configuration

First, a system configuration of an information processing system 1 will be described. FIG. 1 is a diagram illustrating an example of a system configuration of an information processing system according to an embodiment. As illustrated in FIG. 1, the information processing system 1 includes an information processing apparatus 10, an apparatus 20A, an apparatus 20B (hereinafter, when it is not necessary to distinguish each of them, simply referred to as an "apparatus 20") and a terminal 30. The apparatus 20B may be a new apparatus to which the old apparatus 20A is updated. In this case, the apparatus 20B may be, for example, a new model having the same function as the apparatus 20A. Alternatively, the apparatus 20B may be a device for which an operation setting related to energy conservation is updated in the apparatus 20A. The number of the information processing apparatuses 10, the apparatuses 20, and the terminals 30 is not limited to the example of FIG. 1.

The information processing apparatus 10 and the apparatus 20, as well as the information processing apparatus 10 and the terminal 30 may be connected to be able to perform communications via a network NW, whose examples include the Internet, a wireless local area network (LAN), cellular phone networks of Long Term Evolution (LTE), 5G, etc., a LAN, and a signal line. The apparatus 20 may be installed in, for example, a residence, an office, and a public facility. The information processing apparatus 10 may be, for example, a server on a cloud. The information processing apparatus 10 may be, for example, an edge server installed in a building where multiple apparatuses 20 are installed. Further, the information processing apparatus 10 may, for example, be accommodated in the apparatus 20 (for example, a housing of an indoor unit of an air conditioner).

The information processing apparatus 10 estimates information on power consumption when the apparatus 20A installed in a predetermined location (a facility, a room, an equipment) is operated in a predetermined situation based on a data set including a combination of information indicating a situation and information on power consumption when the apparatus 20A installed in the predetermined location has been operated.

The information processing apparatus 10 notifies the user of the energy conservation effect by transmitting information, to the terminal 30, based on a comparison of the estimated information on power consumption when the apparatus 20A has been operated and information on power consumption when the apparatus 20B, which is operated instead of the apparatus 20A, has been operated in the predetermined situation.

The apparatus 20 may be, for example, various apparatuses such as an air conditioner, a refrigerator, a water heater, and a light, and may include an Internet of Things (IoT) device that transmits various kinds of measured information to the information processing apparatus 10.

The terminal 30 may be, for example, a terminal such as a smartphone, a cellular phone, a tablet, and a personal computer used by a user of the apparatus 20. The terminal 30 notifies the user of information indicating the energy conservation effect due to updating the apparatus based on the information received from the information processing apparatus 10.

The user of each apparatus 20 registers IDs and communication addresses of the apparatus 20 and the terminal 30 that the user uses with the information processing apparatus 10 in advance, so that the information processing apparatus 10 can notify each terminal 30 of the user of the apparatus 20 of information such as the energy conservation effect due to updating the apparatus 20A to the apparatus 20B.

Hardware Configuration of Information Processing Apparatus 10 and Apparatus 20

Next, the hardware configuration of the information processing apparatus 10 of the information processing system 1 according to the embodiment will be described.

FIG. 2 is a diagram illustrating an example of a hardware configuration of the information processing apparatus 10 according to the embodiment. As illustrated in FIG. 2, the information processing apparatus 10 includes a Central Processing Unit (CPU) 101, a Read Only Memory (ROM) 102, and a Random Access Memory (RAM) 103. The CPU 101, the ROM 102, and the RAM 103 constitute a so-called computer. The information processing apparatus 10 includes a secondary storage 104, a display unit 105, an operating unit 106, an I/F (Interface) unit 107, and a drive unit 108. The hardware items of the information processing apparatus 10 are interconnected via a bus 109.

The CPU 101 is a processor that executes various programs (for example, a machine learning program, etc.) installed in the secondary storage 104. The ROM 102 is a non-volatile memory. The ROM 102 operates as a primary storage to store various programs, data, etc., required by the CPU 101 to execute various programs installed in the secondary storage 104. Specifically, the ROM 102 stores boot programs, etc., such as the BIOS (Basic Input/Output System) and the EFI (Extensible Firmware Interface).

The RAM 103 is a volatile memory such as a Dynamic Random Access Memory (DRAM), a Static Random Access Memory (SRAM), or the like. The RAM 103 operates as a primary storage to provide a work area into which various programs installed in the secondary storage 104 are loaded when executed by the CPU 101.

The secondary storage 104 stores various programs and information that is used when various programs are executed.

The display unit 105 is a display device that displays various kinds of information. The operating unit 106 is an operating device for receiving various operations. The I/F unit 107 is a communication device that communicates with external apparatuses.

The drive unit 108 is a device for loading a recording medium 110. The recording medium 110 here includes media that optically, electrically, or magnetically record information, such as a CD-ROM, a flexible disk, and a magneto-optical disk. Further, the recording medium 110 may also include semiconductor memories that electrically record information, such as a ROM and a flash memory.

For example, the recording medium 110 as distributed is loaded into the drive unit 108, and various programs recorded in the recording medium 110 are read by the drive unit 108 to be installed in the secondary storage 104. Alternatively, various programs may be downloaded from a network that is not depicted to be installed in the secondary storage 104.

Function Configuration

Next, the functional configuration of the information processing system 1 according to the embodiment will be described with reference to FIG. 3. FIG. 3 is a diagram illustrating an example of functional blocks of the information processing apparatus according to the embodiment.

The information processing apparatus 10 according to the embodiment includes an operating conditions database (DB) 111, an obtaining part 11, a training data generating part 12, a learning part 13, an inference part 14, and a notification part 15. These parts may be implemented by, for example, cooperation of one or more programs installed in the information processing apparatus 10 and of the CPU 101, the ROM 102, the RAM 103, and the like of the information processing apparatus 10.

The obtaining part 11 obtains an operating condition of the apparatus 20 and records the operating condition in the operating conditions DB 111.

The training data generating part 12 generates training data for training (machine learning) information on power consumption according to a surrounding environment and the operation setting of the apparatus 20 when the apparatus 20 is operated based on information obtained by the obtaining part 11. The learning part 13 learns the information on power consumption according to the surrounding environment and the operation setting of the apparatus 20 when the apparatus 20 is operated based on the training data generated by the training data generating part 12.

The inference part 14 infers the energy conservation effect due to updating the apparatus 20A to the apparatus 20B. The inference part 14 infers information on power consumption of the apparatus 20A when the apparatus 20A is used instead of the apparatus 20B in a predetermined period based on, for example, the surrounding environment and the operation setting of the apparatus 20B when the apparatus 20B is operated during the predetermined period obtained by the obtaining part 11, and the training result of the learning part 13. Then, the inference part 14 generates information based on, for example, a comparison of the information on power consumption of the apparatus 20A when the apparatus 20A is used for the predetermined period with the information on power consumption of the apparatus 20B during the predetermined period.

The notification part 15 notifies the user of the apparatus 20 of information indicating the energy conservation effect due to updating the apparatus 20 inferred by the inference part 14.

Process

In the following, a case where the apparatus 20 is an air conditioner will be described as an example, but the disclosed technique can be applied to various apparatuses 20 such as a refrigerator, a water heater, and a light.

Process During Learning

An example of the process of the information processing system 1 during learning according to the embodiment is described with reference to FIG. 4 and FIG. 5. FIG. 4 is a flowchart illustrating an example of the process of the information processing apparatus 10 during learning according to the embodiment. FIG. 5 is a diagram illustrating an example of the history of operating conditions stored in the operating conditions DB 111 according to the embodiment.

Obtaining of Training Data

In step S101, the obtaining part 11 of the information processing apparatus 10 obtains the operating condition of the apparatus 20A installed at a predetermined location. Here, the obtaining part 11 of the information processing apparatus 10 may, for example, obtain information on the current operating condition of the apparatus 20A from the apparatus 20A at predetermined time intervals (for example, one hour). Alternatively, the obtaining part 11 of the information processing apparatus 10 may obtain a history of information on the operating conditions of the apparatus 20A from the apparatus 20A at predetermined time intervals (for example, once a day). The obtaining part 11 of the information processing apparatus 10 may, for example, obtain the history of information on the operating conditions of the apparatus 20A stored in an external server.

Here, the information on operating conditions may include, for example, an apparatus ID that is the ID of the apparatus 20A, the date and time of the operation of the apparatus 20A, information indicating a surrounding environment when the apparatus 20A has been operated (for example, of the date and time), the information on operation setting when the apparatus has been operated, and information on power consumption when the apparatus has been operated.

Next, the obtaining part 11 of the information processing apparatus 10 records the obtained operating condition in the operating conditions DB 111 (step S102).

According to the example of FIG. 5, a set (record) of the information indicating a surrounding environment, the information on operation setting, and the information on power consumption when the apparatus 20 has been operated is stored in the operating conditions DB 111, being correlated with the apparatus ID and the date and time.

Information Indicating a Surrounding Environment When the Apparatus 20 Has Been Operated The information indicating a surrounding environment when the apparatus 20 has been operated may include, for example, outside air temperature (outdoor temperature), the number of people inside a room, indoor illuminance, outside air humidity (outdoor humidity), solar irradiance, weather type, indoor temperature, and indoor humidity.

The outside air temperature is the temperature outside a building in which the apparatus 20 is installed. The outside air temperature may be, for example, measured with a temperature sensor provided in the air conditioner outdoor unit of the apparatus 20.

The number of people inside a room is the number of people inside a room in which the apparatus 20 is installed. The number of people inside a room may be, for example, measured by the apparatus 20 based on information detected with a radiation temperature sensor, a camera, or the like provided in the air conditioner indoor unit of the apparatus 20.

The indoor luminance is luminance inside a room in which the apparatus 20 is installed. The indoor luminance may be, for example, measured with an illuminance sensor provided in the air conditioner indoor unit of the apparatus 20.

The outside air humidity is humidity outside a building in which the apparatus 20 is installed. The outside air humidity may be, for example, measured with a humidity sensor provided in the air conditioner outdoor unit of the apparatus 20.

The solar irradiance is solar irradiance outside a building in which the apparatus 20 is installed. The solar irradiance may be, for example, measured with a solar irradiance sensor (pyranometer) provided in the outdoor unit of the apparatus 20.

The weather type is the type of weather in a region where the apparatus 20 is installed. Examples of weather types may include types such as sunny, cloudy, rainy, and snowy. The weather type is, for example, preset in the apparatus 20. The weather type may also be determined based on information on a region in which the apparatus 20 is installed and information on the weather type of each region at the date and time obtained from the server of a meteorological bureau or the like.

The indoor temperature and the indoor humidity are temperature and humidity, respectively, inside a room in which the apparatus 20 is installed. The indoor temperature and the indoor humidity may be, for example, measured with a temperature sensor and a humidity sensor, respectively, provided in the air conditioner outdoor unit of the apparatus 20.

Information on Operation Setting

The information on operation setting is information on operation setting when the apparatus 20 has been operated. The information on operation setting may include, for example, setting information with respect to the operation of the apparatus 20 provided by a user operating the remote controller of the apparatus 20 or the like. The operation setting may include, for example, an operation mode, set temperature, and a set airflow volume. Examples of operation modes include automatic operation, cooling operation, heating operation, dehumidifying operation, and fan operation. The information on operation setting may include, for example, information on an operation rate (operation time, the number of operating units) of the apparatus 20.

Information on Power Consumption

The information on power consumption is information on power consumption of the apparatus 20 when the apparatus 20 has been operated. The information on power consumption may include at least one of, for example, a power consumption amount integrated value, a power consumption peak value, a current value, a high-pressure pressure, a low-pressure pressure, a compressor rotational speed, and information indicating compressor operating efficiency.

The power consumption amount integrated value is the integrated value of the amount of power consumption of the apparatus 20 within a predetermined period of time (for example, the last ten minutes). The power consumption peak value is, for example, the peak value of the power consumption of the apparatus 20 within a predetermined period of time. The current value is, for example, the average current value of the apparatus 20 within a predetermined period of time.

The high-pressure pressure is the average high-pressure pressure value of the apparatus 20 within a predetermined period of time. The high-pressure pressure is a high-pressure pressure (hereinafter also simply referred to as "high pressure" as appropriate) in the refrigeration cycle of the apparatus 20, and may be, for example, the pressure of the refrigerant compressed and discharged by a compressor (a discharge pressure of the compressor) or the pressure of the refrigerant in the condenser.

The low-pressure pressure is the average low-pressure pressure value of the apparatus 20 within a predetermined period of time. The low-pressure pressure is a low-pressure pressure (hereinafter also simply referred to as "low pressure" as appropriate) in the refrigeration cycle of the apparatus 20, and may be, for example, the pressure of the refrigerant taken in into the compressor (the pressure of the refrigerant before being compressed by the compressor).

The operating efficiency of the compressor is, for example, the efficiency of compressing the refrigerant with predetermined power consumption. The operating efficiency of the compressor, for example, becomes highest when the rotational speed of the compressor is a predetermined value.

Next, the training data generating part 12 of the information processing apparatus 10 generates training data for learning the power consumption according to a condition when the apparatus 20A is operated, based on a data set recorded in the operating conditions DB 111 (step S103).

Here, the training data generating part 12 of the information processing apparatus 10 may, for example, employ, as training data for learning the information on power consumption, a data set including a combination of at least one item included in the information indicating a surrounding environment or the information on operation setting when the apparatus 20A has been operated and the information on power consumption. The data set is recorded in the operating conditions DB 111. In this case, the training data generating part 12 of the information processing apparatus 10 may, for example, use information on at least one item included in the information indicating a surrounding environment or the information on operation setting when the apparatus 20A has been operated as an input and use the information on power consumption as ground truth data, and employ a combination (set) of the input and the ground truth data as the training data for learning the information on power consumption.

Next, the learning part 13 of the information processing apparatus 10 learns, by machine learning, the information on power consumption of the apparatus 20A corresponding to a condition when the apparatus 20A is operated based on the generated training data (step S104).

Here, the learning part 13 of the information processing apparatus 10 may, for example, learn, by machine learning, a regression problem to infer information on power consumption based on an input with supervised learning. The regression problem is, for example, a problem that predicts a continuous value.

The learning part 13 of the information processing apparatus 10 may, for example, perform machine learning using linear regression. In this case, the learning part 13 of the information processing apparatus 10 may, for example, perform machine learning using the method of least squares or the like, using information on power consumption as an objective variable (response variable, dependent variable) and using information on at least one item included in information indicating a situation when the apparatus 20A has been operated as an explanatory variable (input variable, independent variable).

Further, the learning part 13 of the information processing apparatus 10 may, for example, perform machine learning using nonlinear regression. In this case, the learning part 13 of the information processing apparatus 10 may perform machine learning using, for example, a regression neural network (Recurrent neural network), a general regression neural network (General Regression Neural Network), a random forest (Random Forest), a support vector machine (support vector machine, SVM), or the like.

Process During Inference

Figure 7:
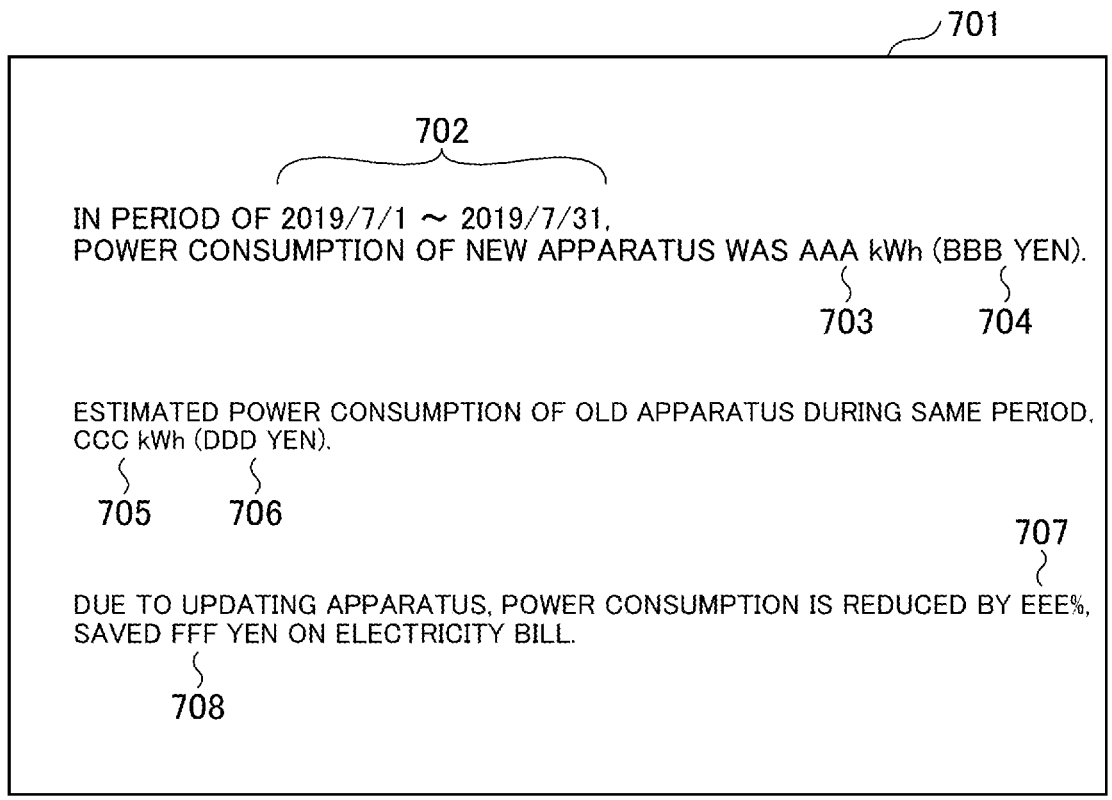
FIG. 7 is a diagram illustrating an example of a notification screen of an energy conservation effect according to the embodiment.

Next, an example of the process of the information processing apparatus 10 during inference of the energy conservation effect according to the embodiment is described with reference to FIG. 6 and FIG. 7. FIG. 6 is a flowchart illustrating an example of the process of the information processing apparatus 10 during inference of the energy conservation effect according to the embodiment. FIG. 7 is a diagram illustrating an example of a notification screen of the energy conservation effect according to the embodiment. In the following, the apparatus 20A installed in a predetermined location is assumed to be updated to the apparatus 20B and the apparatus 20B is assumed to be in operation for a certain period of time.

In step S201, the obtaining part 11 of the information processing apparatus 10 obtains an operating condition of the apparatus 20B installed at a place where the apparatus 20A was installed during a predetermined period. Here, the obtaining part 11 of the information processing apparatus 10 may obtain the operating condition of the apparatus 20 for a period specified by the user.

Next, the inference part 14 of the information processing apparatus 10 infers information on power consumption of the apparatus 20A when the apparatus 20A is operated for the predetermined period, based on the information indicating the surrounding environment and the information on operation setting when the apparatus 20B has been operated, and the training result of the information on power consumption by the process in step S104 of FIG. 4, which are included in the obtained operating conditions for the predetermined period (step S202). Here, the inference part 14 of the information processing apparatus 10 inputs information on an item used when learning the information on power consumption among the items included in the information indicating the surrounding environment and the information on operation setting when the apparatus 20B has been operated. Then, the inference part 14 of the information processing apparatus 10 uses the training result of the information on power consumption to infer the information on power consumption by the apparatus 20A.

Further, the inference part 14 of the information processing apparatus 10 may infer information on power consumption by the apparatus 20A based on each training result by each of the above-described methods. In this case, the inference part 14 of the information processing apparatus 10 infers the information on power consumption by the apparatus 20A based on each training result by each of the methods described in the process in step S104 of FIG. 4. The inference part 14 of the information processing apparatus 10 may infer the average value of the inferred values or the like as information on power consumption by the apparatus 20A.

Next, the inference part 14 of the information processing apparatus 10 generates information indicating the energy conservation effect based on a comparison of the information on power consumption of the apparatus 20A when the apparatus 20A has been used for the predetermined period with information on power consumption of the apparatus 20B during the predetermined period (step S203). Here, for example, the inference part 14 of the information processing apparatus 10 may calculate information on an electricity bill that has been reduced due to updating the apparatus 20 according to the difference between the power consumption of the old apparatus 20A and the power consumption of the new apparatus 20B. Further, the inference part 14 of the information processing apparatus 10 may calculate a ratio of the power consumption that has been reduced due to updating the apparatus 20, for example, according to the ratio of the power consumption of the old apparatus 20A to the power consumption of the new apparatus 20B.

Next, the notification part 15 of the information processing apparatus 10 notifies the user of the apparatus 20 of information indicating the energy conservation effect due to updating the apparatus 20 inferred by the inference part 14 (step S204). Here, for example, the information processing apparatus 10 transmits information that causes a display screen 701 illustrated in FIG. 7 to be displayed on the terminal 30. In the example of FIG. 7, the notification part 15 of the information processing apparatus 10 displays a period 702 for comparison of energy conservation effect, power consumption 703 and an electricity bill 704 in the new apparatus 20B during the period 702, and power consumption 705 and an electricity bill 706 in the old apparatus 20A during the period 702.

Further, the notification part 15 of the information processing apparatus 10 also displays a ratio 707 of the power consumption reduced during the period 702 due to updating the apparatus 20 and an electricity bill 708 reduced due to updating the apparatus 20. Accordingly, even when the power consumption in the summer period is lower than in the last year, for example, due to a cool summer of the last year in which the old apparatus 20A was operated and a hot summer of this year in which the new apparatus 20B has been operated, the energy conservation effect due to updating the apparatus 20 can be appropriately presented to the user.

Modification 1

The information processing apparatus 10 may, for example, infer the energy conservation effect when the apparatus 20A is updated to the apparatus 20B. Thus, for example, the energy conservation effect that would have been obtained if the apparatus 20 was updated earlier can be presented to the user.

In this case, the learning part 13 of the information processing apparatus 10 learns information indicating the surrounding environment in which the apparatus 20B is operated and information on power consumption according to the operation setting of the apparatus 20, through the same processing as that in FIG. 4, based on the operation condition of the apparatus 20B. Then, the inference part 14 infers the information on power consumption of the apparatus 20B when the apparatus 20B is used instead of the apparatus 20A in the predetermined period, based on, for example, the surrounding environment and the operation setting of the apparatus 20B when the apparatus 20A has been operated in the predetermined period obtained by the obtaining part 11, and the training result of the information on power consumption of the apparatus 20B by the learning part 13. Then, the inference part 14 may, for example, generate information based on a comparison of the information on power consumption of the apparatus 20B when the apparatus 20B has been used for the predetermined period with the information on power consumption of the apparatus 20A during the predetermined period.

Modification 2

Before updating the apparatus 20A to the apparatus 20B, the energy conservation effect due to updating may be inferred and notified to the user of the apparatus 20.

In this case, the learning part 13 of the information processing apparatus 10 performs machine learning with respect to, for example, characteristics of various buildings according to information indicating a situation and information on power consumption based on a data set including the information indicating the characteristics of the various buildings (an example of an "air conditioning load"), the information indicating a situation, and the information on power consumption from each apparatus 20, of the same type (the same model) as the apparatus 20A, installed in the various buildings (laboratories) in which the apparatus 20 is supposed to be installed by the user.

The information indicating the characteristics of the building may include, for example, information on a heat load to be transferred by a temperature difference from the outside air through the heat transfer and radiation, an outside air load due to drafts from the windows or doors and the outside air coming in for ventilation, and solar radiation, which is the heat, of the solar heat, that enters through glass and the heat that enters through a roof or a wall.

The inference part 14 of the information processing apparatus 10 infers the air conditioning load according to a situation at a predetermined location based on a data set including, for example, information indicating a situation and information on power consumption when the apparatus 20A installed at the predetermined location has been operated.

Further, the learning part 13 of the information processing apparatus 10 performs machine learning with respect to, for example, information on power consumption according to information indicating a situation and information indicating characteristics of various buildings based on a data set including the information indicating the characteristics of the various buildings, the information indicating a situation, and the information on power consumption from each apparatus 20, of the same type (the same model) as the apparatus 20B, installed in the various buildings.

Then, the information processing apparatus 10 inferring part 14 infers information on power consumption of the apparatus 20B at the predetermined location based on, for example, the estimated air conditioning load at the predetermined location and the information indicating a situation during the predetermined period.

Then, the notification part 15 of the information processing apparatus 10 notifies the terminal 30 of information on the estimated power consumption of the apparatus 20B.

Modification 3

Each of the functional parts of the information processing apparatus 10 may be implemented by cloud computing, for example, composed of one or more computers. Further, at least a part of the process of the functional parts of the information processing apparatus 10 described above may be executed by the apparatus 20. The information processing apparatus 10 and the apparatus 20 may be configured as an integrated apparatus.

Embodiments are described above, while it will be understood that various changes in form and details are possible without departing from the spirit and scope of the claims.

The present invention is based upon and claims priority to basic application No. 2019-180996, filed with the Japan Patent Office on Sep. 30, 2019, the entire contents of which are incorporated herein by reference.

DESCRIPTION OF REFERENCE SYMBOLS 1 information processing system
10 information processing apparatus
111 operating conditions DB
11 obtaining part
12 training data generating part
13 learning part
14 inference part
15 notification part

The invention claimed is:

1. An information processing method implemented by an information processing apparatus, the information processing method comprising:
obtaining, during a predetermined period, an operating condition of a second air conditioner that is installed in a predetermined location, instead of a first air conditioner that is installed in a same location as the predetermined location;
performing a first estimation process, based on a result of machine learning that is performed on a data set, the data set including a combination of information indicating a situation and information on power consumption in a case where the first air conditioner, installed in the same location as the predetermined location, has been operated, the first estimation process being a process of estimating first information on power consumption in a case where the first air conditioner, installed in the same location as the predetermined location, is operated under a same condition as the operating condition, wherein the machine learning includes generating a machine learning model;
obtaining a value indicating power consumption that is actually measured in a case where, instead of using the first air conditioner, the second air conditioner installed in the predetermined location has been operated under the same condition as the operating condition under which the first air conditioner has been operated;
calculating second information based on a comparison of the actually measured value with the first information on the power consumption that is estimated by the first estimation process in the case where the first air conditioner is operated under the same condition as the operating condition; and notifying of the calculated second information such that the second information is output onto a user interface through which a user indication is provided, the user indication including a reduction ratio of the actually measured value for the second air conditioner, to the power consumption that is determined based on the first information relating to the first air conditioner, wherein the generating of the machine leaning model includes generating the machine learning model based on a second data set including a combination of (i) information indicating a situation of at least one third air conditioner, (ii) information on power consumption of the at least one third air conditioner, and (iii) a first air conditioning load that is derived from a heat load, and radiant heat, relating to a first building where the at least one third air conditioner is provided, wherein the third air conditioner is a same type as the first air conditioner, wherein the first estimation process includes using the machine learning model generated based on the second data set to determine a second air conditioning load that is derived from a heat load, and radiant heat, relating to a second building where the second air conditioner is to be provided, and wherein the information processing method further comprises operating the first air conditioner at a load corresponding to the determined second air conditioning load.

2. The information processing method as claimed in claim 1, further comprising:

performing a second estimation process, based on a data set including a combination of information indicating a situation and power consumption when the second air conditioner has been operated, the second estimation process being a process of estimating information on power consumption when the second air conditioner is operated in a predetermined situation; and notifying of information based on a comparison of the first information on the power consumption when the first air conditioner is operated, with the information on the power consumption estimated by the second estimation process when the second air conditioner is operated.

3. The information processing method as claimed in claim 1, further comprising:

estimating an air conditioning load according to a situation in the predetermined location, based on the data set including the combination of the information indicating the situation and the information on the power consumption of the first air conditioner when the first air conditioner, installed in the predetermined location, has been operated; and notifying of information on power consumption of the second air conditioner with respect to the estimated air conditioning load.

4. The information processing method as claimed in claim 1, wherein the information indicating the situation includes at least one of indoor temperature, indoor humidity, outdoor temperature, and outdoor humidity.

5. The information processing method as claimed in claim 1, wherein the information on the power consumption includes at least one of an integrated value of a power consumption amount, a power consumption peak value, a current value, a high-pressure pressure, a low-pressure pressure, a rotational speed of a compressor, or information indicating operating efficiency of the compressor.

6. The information processing method as claimed in claim 1, further comprising:

performing a second estimation process, based on a data set including a combination of information indicating a situation and power consumption when the second air conditioner has been operated, the second estimation process being a process of estimating information on power consumption when the second air conditioner is operated in a predetermined situation;

notifying of information based on a comparison of the first information on the power consumption when the first air conditioner is operated, with the information on the power consumption estimated by the second estimation process when the second air conditioner is operated;

estimating an air conditioning load according to a situation in the predetermined location, based on the data set including the combination of the information indicating the situation and the information on the power consumption of the first air conditioner when the first air conditioner, installed in the predetermined location, has been operated; and notifying of information on power consumption of the second air conditioner with respect to the estimated air conditioning load.

7. The information processing method as claimed in claim 1, further comprising:

performing a second estimation process, based on a data set including a combination of information indicating a situation and power consumption when the second air conditioner has been operated, the second estimation process being a process of estimating information on power consumption when the second air conditioner is operated in a predetermined situation; and notifying of information based on a comparison of the first information on the power consumption when the first air conditioner is operated, with the information on the power consumption estimated by the second estimation process when the second air conditioner is operated, and wherein the information indicating the situation includes at least one of indoor temperature, indoor humidity, outdoor temperature, and outdoor humidity.

8. The information processing method as claimed in claim 1, further comprising:

performing a second estimation process, based on a data set including a combination of information indicating a situation and power consumption when the second air conditioner has been operated, the second estimation process being a process of estimating information on power consumption when the second air conditioner is operated in a predetermined situation; and notifying of information based on a comparison of the first information on the power consumption when the first air conditioner is operated, with the information on the power consumption estimated by the second estimation process when the second air conditioner is operated, and wherein the information on the power consumption includes at least one of a power consumption amount integrated value, a power consumption peak value, a current value, a high-pressure pressure, a low-pressure pressure, a compressor rotational speed, and information indicating compressor operating efficiency.

9. An information processing apparatus comprising:
processing circuitry configured to obtain, during a predetermined period, an operating condition of a second air conditioner that is installed in a predetermined location, instead of a first air conditioner installed in a same location as the predetermined location;

perform a first estimation process, based on a result of machine learning that is performed on a data set, the data set including a combination of information indicating a situation and information on power consumption in a case where the first air conditioner, installed in the same location as the predetermined location, has been operated, the first estimation process being a process of estimating first information on power consumption in a case where the first air conditioner, installed in the same location as the predetermined location, is operated under a same condition as the operating condition, wherein the machine learning includes generating a machine learning model;

obtain a value indicating power consumption that is actually measured in a case where, instead of using the first air conditioner, the second air conditioner installed in the predetermined location has been operated under the same condition as the operating condition under which the first air conditioner has been operated;

calculate second information based on a comparison of the actually measured value with the first information on the power consumption that is estimated by the first estimation process in the case where the first air conditioner is operated under the same condition as the operating condition; and notify of the calculated second information such that the second information is output onto a user interface through which a user indication is provided, the user indication including a reduction ratio of the actually measured value for the second air conditioner, to the power consumption that is determined based on the first information relating to the first air conditioner, wherein the generating of the machine leaning model includes generating the machine learning model based on a second data set including a combination of (i) information indicating a situation of at least one third air conditioner, (ii) information on power consumption of the at least one third air conditioner, and (iii) a first air conditioning load that is derived from a heat load, and radiant heat, relating to a first building where the at least one third air conditioner is provided, wherein the third air conditioner is a same type as the first air conditioner, wherein the first estimation process includes using the machine learning model generated based on the second dataset to determine a second air conditioning load that is derived from a heat load, and radiant heat, relating to a second building where the second air conditioner is to be provided, and wherein the first air conditioner is operated at a load corresponding to the determined second air conditioning load.

10. A non-transitory computer readable medium storing a program that causes a computer to execute a method, the method comprising:

obtaining, during a predetermined period, an operating condition of a second air conditioner that is installed in a predetermined location, instead of a first air conditioner installed in a same location as the predetermined location;

performing a first estimation process, based on a result of machine learning that is performed on a data set, the data set including a combination of information indicating a situation and information on power consumption in a case where the first air conditioner, installed in the same location as the predetermined location, has been operated, the first estimation process being a process of estimating first information on power consumption in a case where the first air conditioner, installed in the same as the predetermined location, is operated under a same condition as the operating condition, wherein the machine learning includes generating a machine learning model;

obtaining a value indicating power consumption that is actually measured in a case where, instead of using the first air conditioner, the second air conditioner installed in the predetermined location has been operated under the same condition as the operating condition under which the first air conditioner has been operated;

calculating second information based on a comparison of the actually measured value with the first information on the power consumption that is estimated by the first estimation process in the case where the first air conditioner is operated under the same condition as the operating condition; and notifying of the calculated second information such that the second information is output onto a user interface through which a user indication is provided, the user indication including a reduction ratio of the actually measured value for the second air conditioner, to the power consumption that is determined based on the first information relating to the first air conditioner, wherein the generating of the machine leaning model includes generating the machine learning model based on a second data set including a combination of (i) information indicating a situation of at least one third air conditioner, (ii) information on power consumption of the at least one third air conditioner, and (iii) a first air conditioning load that is derived from a heat load, and radiant heat, relating to a first building where the at least one third air conditioner is provided, wherein the third air conditioner is a same type as the first air conditioner, wherein the first estimation process includes using the machine learning model generated based on the second dataset to determine a second air conditioning load that is derived from a heat load, and radiant heat, relating to a second building where the second air conditioner is to be provided, and wherein the method further comprises operating the first air conditioner at a load corresponding to the determined second air conditioning load.

* * * * *